Oct. 15, 1968  D. E. LEE  3,405,609
DIAPHRAGM SEALS
Filed Nov. 23, 1965
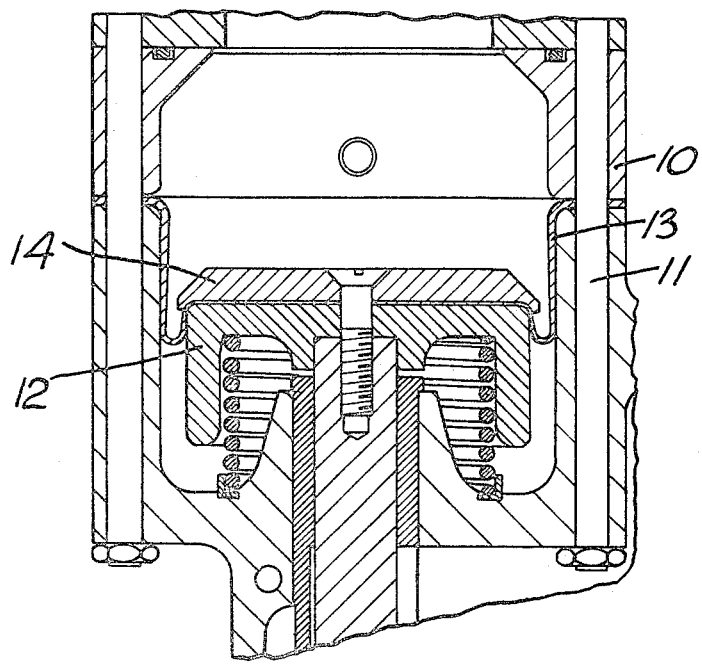

United States Patent Office 3,405,609
Patented Oct. 15, 1968

3,405,609
DIAPHRAGM SEALS
Denis Ernest Lee, Acocks Green, Birmingham, England, assignor to Joseph Lucas (Industries) Limited, Birmingham, England, a British company
Filed Nov. 23, 1965, Ser. No. 509,335
1 Claim. (Cl. 92—99)

ABSTRACT OF THE DISCLOSURE

A resilient rolling diaphragm has its outer periphery attached to a cylinder wall. The inner periphery is attached to a piston in the cylinder. The diaphragm wall in cross section has a uniformly diminishing thickness from the outer periphery to the inner peripheral portion.

---

This invention relates to diaphragm seals of the kind intended to be used to seal a space defined between a hollow body and a member movable relatively to the body in the manner of a piston and cylinder, opposite edges of the seal being intended to be secured at the interior wall of the hollow body and at the member respectively, sufficient space being defined between the body and member to permit the seal to take up a generally U-shaped configuration, in cross-section.

It has been found, with conventional seals of this kind, which are usually referred to as rolling diaphragms, that under certain pressure conditions on opposite sides of the seal, there is a tendency for the seal to form two folds near its opposite edges respectively thus increasing resistance to relative movement of the body and member and also possibly causing damage to the seal itself.

The object of the invention is to provide a seal of the kind specified in which this tendency is minimised.

According to the present invention, a diaphragm seal of the kind specified is characterised in that the cross-section reduces from a first region to a second region, at or near the edges of the seal respectively.

The invention will now be described by way of example wtih reference to the accompanying drawing in which the single figure is a cross-sectional view of a piston and cylinder type pump.

In this construction there is a hollow body 10 defining a cylinder and formed from two sections secured together by bolts 11. Within the body 10 is a piston 12 mounted for axial movement in the body 10.

Trapped between the two sections of the body is one edge of a diaphragm seal 13 which has a flange for this purpose.

The opposite edge of the seal 13 is clamped to the piston 12 by means of a plate 14 secured to the flat end face of the piston 12.

The seal 13 is formed from rubber or a similar resilient material and the cross-section of the seal reduces substantially uniformly from the flange clamped between the sections of the body 10 and its opposite edge, which is secured to the piston 12.

Initially, the seal is of top hat section and is then secured in place so that between the regions at which it is clamped, the seal takes up a generally U-shaped configuration, as seen in the drawing occupying a space defined between the body 10 and the piston 12 sufficiently large to accommodate this without contact between the two limbs of the U.

The inherent greater stiffness of the thicker portion of the seal as compared with the thinner portion tends to prevent the formation of a subsidiary fold in the seal when a greater pressure is applied to the seal on one side, than exists on the other.

What I claim is:
1. A piston and cylinder type pump including a two piece cylinder; a piston with securing means on its head surface; and a resilient rolling diaphragm, the outer peripheral portion being held in place by the two pieces of the cylinder and the inner peripheral portion being held by said securing means, said diaphragm having a radial cross-section which uniformily reduces in thickness from the outer peripheral portion to the inner peripheral portion and normally assumes a U-shaped configuration, said U occupying the radial space between said piston and said cylinder.

References Cited

UNITED STATES PATENTS

| | | | |
|---|---|---|---|
| 3,227,093 | 1/1966 | Taplin | 92—100 X |
| 2,687,015 | 8/1954 | Edwards | 74—18.2 X |
| 2,919,718 | 1/1960 | Mercier | 92—98 X |

MILTON KAUFMAN, Primary Examiner.